(12) United States Patent
Tomita et al.

(10) Patent No.: US 8,373,791 B2
(45) Date of Patent: Feb. 12, 2013

(54) CAMERA SYSTEM, LENS BARREL, CAMERA BODY, AND CAMERA SYSTEM CONTROL METHOD

(75) Inventors: Hiroyuki Tomita, Yokohama (JP); Noriaki Nakajima, Yokohama (JP)

(73) Assignee: Nikon Corporation, Tokyo (JP)

( * ) Notice: Subject to any disclaimer, the term of this patent is extended or adjusted under 35 U.S.C. 154(b) by 922 days.

(21) Appl. No.: 12/216,042

(22) Filed: Jun. 27, 2008

(65) Prior Publication Data

US 2009/0002543 A1 Jan. 1, 2009

(30) Foreign Application Priority Data

Jun. 29, 2007 (JP) ................ 2007-171903

(51) Int. Cl.
*H04N 5/232* (2006.01)
*G03B 13/00* (2006.01)

(52) U.S. Cl. ............... 348/345; 348/346
(58) Field of Classification Search ........ 348/345–353
See application file for complete search history.

(56) References Cited

U.S. PATENT DOCUMENTS

| 6,453,124 | B2 | 9/2002 | Morimoto et al. | |
| 7,209,175 | B1 * | 4/2007 | Kurokawa et al. | 348/345 |
| 7,671,917 | B2 * | 3/2010 | Izukawa | 348/340 |
| 7,697,830 | B2 * | 4/2010 | Ide et al. | 396/104 |
| 2005/0012846 | A1 * | 1/2005 | Shinohara | 348/345 |
| 2007/0279516 | A1 | 12/2007 | Ishii | |
| 2008/0025717 | A1 | 1/2008 | Kawanishi | |
| 2009/0273702 | A1 * | 11/2009 | Okawara | 348/345 |

FOREIGN PATENT DOCUMENTS

| JP | A-2001-272593 | 10/2001 |
| JP | A-2003-005019 | 1/2003 |
| JP | A-2004-085838 | 3/2004 |
| JP | A-2004-109690 | 4/2004 |
| JP | A-2006-023653 | 1/2006 |
| JP | A-2007-310009 | 11/2007 |

OTHER PUBLICATIONS

Aug. 2, 2011 Office Action issued in JP Application No. 2007-171903 (with English translation).

* cited by examiner

*Primary Examiner* — Kelly L Jerabek
(74) *Attorney, Agent, or Firm* — Oliff & Berridge, PLC

(57) ABSTRACT

A camera system includes: a focus detection controller that is capable of performing control for an imaging optics according to a plurality of focus detection systems; and a focusing controller that controls focusing of the imaging optics. And the focus detection controller transmits, to the focusing controller, identification information that specifies which of the plurality of focus detection systems is performed.

27 Claims, 6 Drawing Sheets

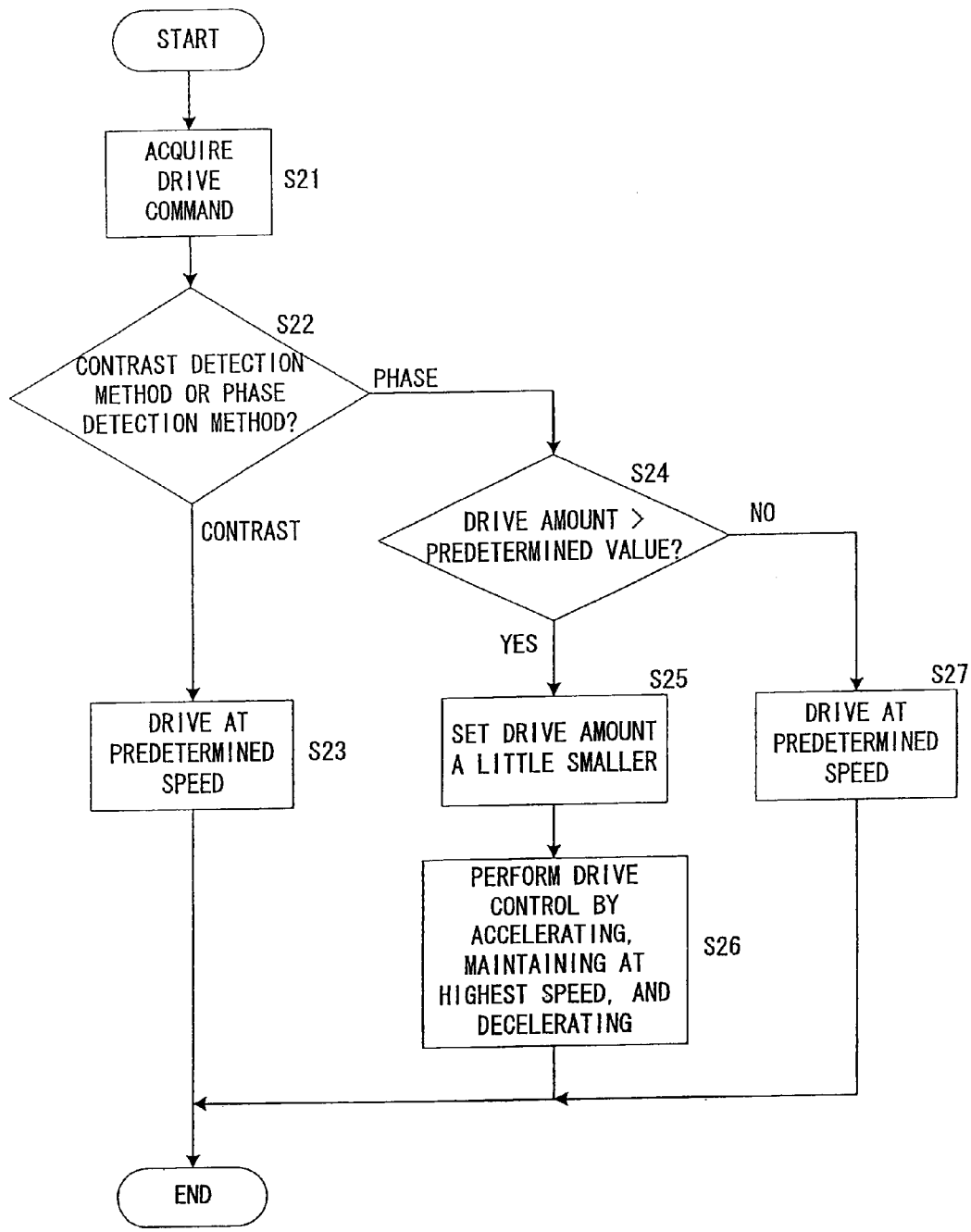

CAMERA SYSTEM, LENS BARREL, CAMERA BODY, AND CAMERA SYSTEM CONTROL METHOD

INCORPORATION BY REFERENCE

The disclosure of the following priority application is herein incorporated by reference:

Japanese Patent Application No. 2007-171903, filed Jun. 29, 2007.

BACKGROUND OF THE INVENTION

1. Field of the Invention

The present invention relates to a camera system that can be controlled according to a plurality of focus detection systems.

2. Description of Related Art

A digital camera that uses both a phase detection method (system) and also a contrast detection method (system) for autofocusing is known (refer to Japanese Laid-Open Patent Publication 2001-272593).

SUMMARY OF THE INVENTION

With such a digital camera that uses both a phase detection method and also a contrast detection method for autofocusing, appropriate control taking advantage of the strong points of both methods is required.

According to the 1st aspect of the present invention, a camera system, comprises: a focus detection controller that is capable of performing control for an imaging optics according to a plurality of focus detection systems; and a focusing controller that controls focusing of the imaging optics. And the focus detection controller transmits, to the focusing controller, identification information that specifies which of the plurality of focus detection systems is performed.

According to the 2nd aspect of the present invention, in the camera system according to the 1st aspect, it is preferred that the focusing controller changes driving control of the imaging optics according to the identification information.

According to the 3rd aspect of the present invention, in the camera system according to the 2nd aspect, it is preferred that the focusing controller sets driving conditions of the imaging optics according to the identification information.

According to the 4th aspect of the present invention, in the camera system according to the 3rd aspect, it is preferred that the focusing controller sets focusing speed of the imaging optics according to the identification information.

According to the 5th aspect of the present invention, in the camera system according to the 4th aspect, it is preferred that when the identification information specifies a first one of the plurality of focus detection systems, the focusing controller performs control so as to limit the focusing speed to a lower speed than focusing speed when the identification information specifies a second one of the plurality of focus detection systems.

According to the 6th aspect of the present invention, in the camera system according to the 4th aspect, it is preferred that: when the identification information specifies a first one of the plurality of focus detection systems, the focusing controller controls the focusing speed to be constant; and when the identification information specifies a second one of the plurality of focus detection systems, the focusing controller performs control to vary the focusing speed.

According to the 7th aspect of the present invention, in the camera system according to the 1st aspect, it is preferred that the focusing controller sets processing when stopping focusing of the imaging optics according to the identification information.

According to the 8th aspect of the present invention, in the camera system according to the 7th aspect, it is preferred that when the identification information specifies a second one of the plurality of focus detection systems, the focusing controller performs control so as to stop focusing before a target stop position for the imaging optics.

According to the 9th aspect of the present invention, in the camera system according to the 8th aspect, it is preferred that the focusing controller performs control so as to stop focusing before the target stop position for the imaging optics according to a focus depth of the imaging optics.

According to the 10th aspect of the present invention, in the camera system according to the 8th aspect, it is preferred that the focusing controller performs control so as to stop focusing before the target stop position for the imaging optics according to a stop control error of the focusing controller.

According to the 11th aspect of the present invention, in the camera system according to the 1st aspect, it is preferred that the focus detection controller transmits focusing command information that commands focusing of the imaging optics, to the focusing controller along with the identification information.

According to the 12th aspect of the present invention, in the camera system according to the 11, it is preferred that: the camera system further comprises a camera body and a lens barrel; the focus detection controller is included in the camera body; and the focusing controller is included in the lens barrel.

According to the 13th aspect of the present invention, a lens barrel comprises: an imaging optics; a receiver that receives identification information that specifies which of a plurality of focus detection systems is performed, from a camera body that is capable of performing control for the imaging optics according to the plurality of focus detection systems; and a focusing controller that performs control so as to set driving conditions of the imaging optics according to the identification information received by the receiver.

According to the 14th aspect of the present invention, in the lens barrel according to claim 13th aspect, it is preferred that the focusing controller controls focusing of the imaging optics at a highest speed in a performance specification of the imaging optics, when the received identification information specifies a phase detection autofocusing system.

According to the 15th aspect of the present invention, in the lens barrel according to claim 13th aspect, it is preferred that the focusing controller performs control so as to stop focusing before a focused position of the imaging optics, when the received identification information specifies a phase detection autofocusing system.

According to the 16th aspect of the present invention, in the lens barrel according to claim 13th aspect, it is preferred that the focusing controller controls focusing of the imaging optics at a constant speed, when the received identification information specifies a contrast detection autofocusing system.

According to the 17th aspect of the present invention, a camera body in which a lens barrel including an imaging optics and a focusing controller that controls focusing of the imaging optics is exchangeable, comprises: a focus detection controller that is capable of controlling the imaging optics according to a plurality of focus detection systems; and a transmitter that transmits to the lens barrel identification information specifying which of the plurality of focus detection systems is performed.

According to the 18th aspect of the present invention, a camera system control method comprises: enabling an imaging optics to be controlled according to a plurality of focus detection systems; transmitting identification information that specifies which of the plurality of focus detection systems is performed, to a focusing controller that controls focusing of the imaging optics.

According to the 19th aspect of the present invention, in the camera system control method according to the 18th aspect, it is preferred that the focusing controller changes driving control of the imaging optics according to the identification information.

According to the 20th aspect of the present invention, in the camera system control method according to the 19th aspect, it is preferred that the focusing controller sets driving conditions of the imaging optics according to the identification information.

According to the 21st aspect of the present invention, in the camera system control method according to the 20th aspect, it is preferred that the focusing controller sets focusing speed of the imaging optics according to the identification information.

According to the 22nd aspect of the present invention, in the camera system control method according to the 21st aspect, it is preferred that when the identification information specifies a first one of the plurality of focus detection systems, the focusing controller performs control so as to limit the focusing speed to a lower speed than focusing speed when the identification information specifies a second one of the plurality of focus detection systems.

According to the 23rd aspect of the present invention, in the camera system control method according to the 21st aspect, it is preferred that: when the identification information specifies a first one of the plurality of focus detection systems, the focusing controller controls the focusing speed to be constant; and when the identification information specifies a second one of the plurality of focus detection systems, the focusing controller performs control to vary the focusing speed.

According to the 24th aspect of the present invention, in the camera system control method according to the 18th aspect, it is preferred that the focusing controller performs processing when stopping focusing of the imaging optics according to the identification information.

According to the 25th aspect of the present invention, in the camera system control method according to the 24th aspect, it is preferred that when the identification information specifies a second one of the plurality of focus detection systems, the focusing controller performs control so as to stop focusing before a target stop position for the imaging optics.

According to the 26th aspect of the present invention, in the camera system control method according to the 25th aspect, it is preferred that the focusing controller performs control so as to stop focusing before the target stop position for the imaging optics according to a focus depth of the imaging optics.

According to the 27th aspect of the present invention, in the camera system control method according to the 25th aspect, it is preferred that the focusing controller performs control so as to stop focusing before the target stop position for the imaging optics according to a stop control error of the focusing controller.

According to the 28th aspect of the present invention, in the camera system control method according to the 28th aspect, it is preferred that focusing command information that commands focusing of the imaging optics is transmitted to the focusing controller along with the identification information.

According to the 29th aspect of the present invention, in the camera system control method according to the 28th aspect, it is preferred that: the plurality of focus detection systems for the imaging optics are controlled from a side of a camera body; and the focusing of the imaging optics is controlled from a side of a lens barrel.

BRIEF DESCRIPTION OF THE DRAWINGS

FIG. 6 is a figure showing a flowchart of a program that is executed by a CPU provided within a lens barrel.

DESCRIPTION OF THE PREFERRED EMBODIMENTS

In autofocusing by the phase (phase difference) detection method (system), the light from the lens optical system (optics) is separated into two and is imaged twice upon two line sensors, and the amount of deviation of focus (i.e. the defocusing amount) is obtained from the amount of deviation between the two images that are imaged upon these two line sensors. In autofocusing by the phase detection method, the lens can be driven at high speed, since the direction towards the focus position and the drive amount to the focus position are known from the phase detection method sensor (the phase type AF detection element 100) that consists of this type of line sensors.

However, in order not to over-run the focus position, it is necessary to stop the lens a little before the focus position. There is a possibility that, when this is done, the problem may arise that the focusing accuracy is decreased. Moreover, if the lens is stopped exactly at the focus position, then sometimes, depending upon circumstances, the lens may over-run. If this happens, it is necessary perform operation to reverse the lens. Due to this there is a possibility that, if there is any play in the drive mechanism for the lens, the problem may arise of the movement of the lens hunting (i.e. of the lens not stopping but moving to and fro before and after the focus position).

On the other hand, autofocusing by the contrast detection method (system) is a method in which, while driving the lens, an indicator (the focus evaluation value) that represents the focusing state is acquired, and that position in which the focus evaluation value attains its maximum is taken as the focus position. The focus evaluation value is generally obtained by applying a predetermined filter to the image signal that is outputted from the image sensor over a predetermined time interval ($\Delta t$) and integrating it. With this type of autofocusing by the contrast detection method, the accuracy of detection of the focus position is enhanced if the drive speed of the lens is slow, since the gaps between the focus evaluation values that are obtained are narrow.

However, if the drive speed is undesirably fast, the problem arises that the accuracy of detection of the focus position decreases, since the gaps between the focus evaluation values that are acquired become undesirably wide. In other words, with autofocusing by the contrast detection method, when the drive speed of the lens is not slow and the gaps between acquisition of the focus evaluation values are not narrower than some level, then accuracy cannot be obtained.

Figure 2:
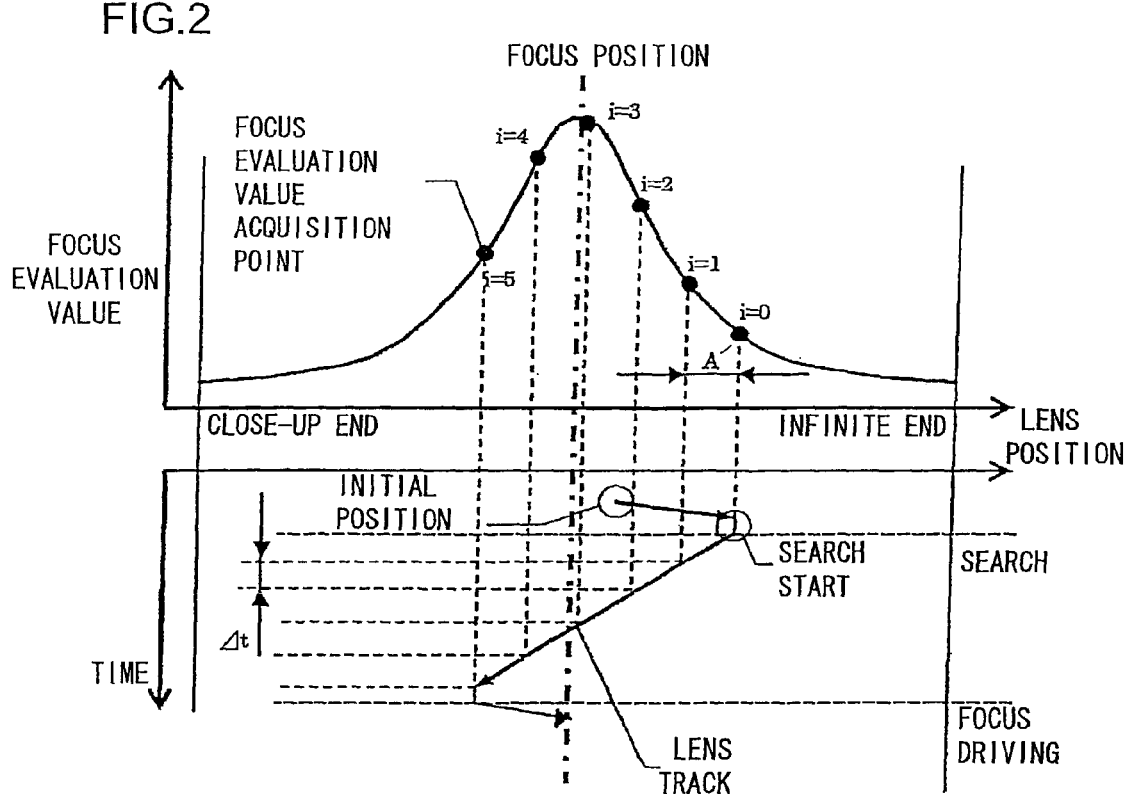
FIG. 2 is a figure showing a situation during autofocusing by the contrast detection method in which a focus evaluation value is acquired when the lens drive speed is slow.
Figure 3:
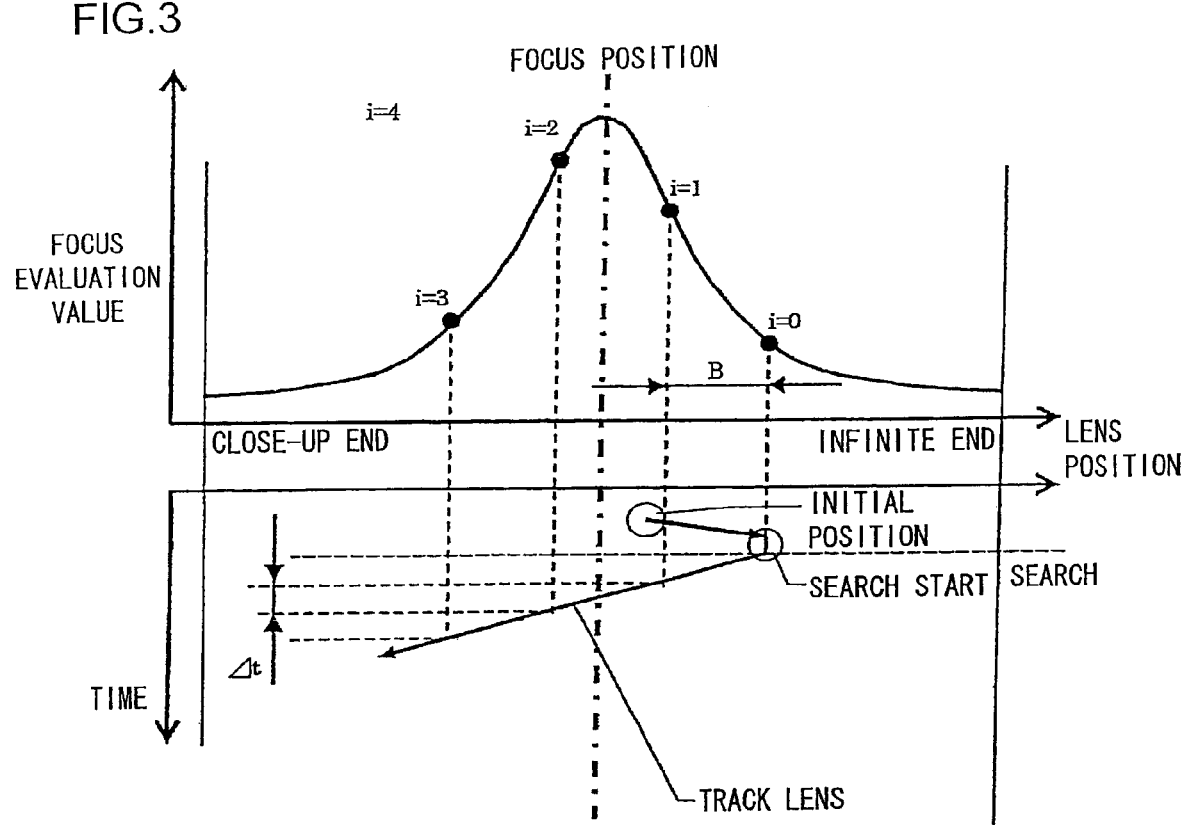
FIG. 3 is a figure showing a situation during autofocusing by the contrast detection method in which a focus evaluation value is acquired when the lens drive speed is fast.

FIG. 2 shows a situation in which, during autofocusing by the contrast detection method, the focus evaluation value is acquired when the drive speed is slow, and FIG. 3 is a figure showing a situation in which the focus evaluation value is acquired when the drive speed is fast. FIG. 3 shows that the gap between the focus evaluation values has become wide, and, depending upon the circumstances, the accuracy may decrease or it may even become impossible to obtain any focus position at all.

With a single lens reflex type camera (not limited to a digital camera but also including a film type camera), normally, a sensor for detecting the focus position is provided, and, during AF operation, it is a conventionally used method to output a command for driving the lens, from the camera body to the lens. Moreover, in a prior art single lens reflex type camera, autofocusing by the phase detection method is conventionally employed, and the drive speed for the lens is set to high in order to perform focusing operation quickly, since the drive amount and the direction to the focus position are known.

Due to this, if it is arranged, as with the camera 1 of this embodiment, to provide autofocusing by the contrast detection method in addition to autofocusing by the phase detection method, then a drive speed for the lens during the autofocusing by the contrast detection method that is the same as during autofocusing by the phase detection method is too fast. In other words, a problem arises as shown in FIG. 3.

Thus, with the camera 1 of this embodiment, a structure like that explained below is employed, and control is performed while exploiting the strong points of both these methods, i.e. of the method of autofocusing by phase detection and also of the method of autofocusing by contrast detection.

Returning to FIG. 1, this camera 1 will be explained in more detail. The camera body 10 (the camera main body) is a camera body of a single lens reflex type camera, and moreover is of a detachable lens type. And the image sensor 20 converts an image that has been imaged by a lens optical system (an imaging optics, an imaging optical system) 210 to an electrical signal, that is then outputted. Although these details are not shown in the figure, an infra-red cutoff filter for cutting out infra-red light and an optical low pass filter for aliasing noise of the image are disposed upon the frontmost surface of the image surface; but these may be said to be included within the image sensor 20.

The viewfinder 11 includes a focusing screen 25, a penta prism 30, a photometric element 40, a relay lens 50, and an eyepiece unit 60. The photometric element 40 measures the brightness of the image, and is used for determining the shutter speed and the aperture value.

Figure 1:
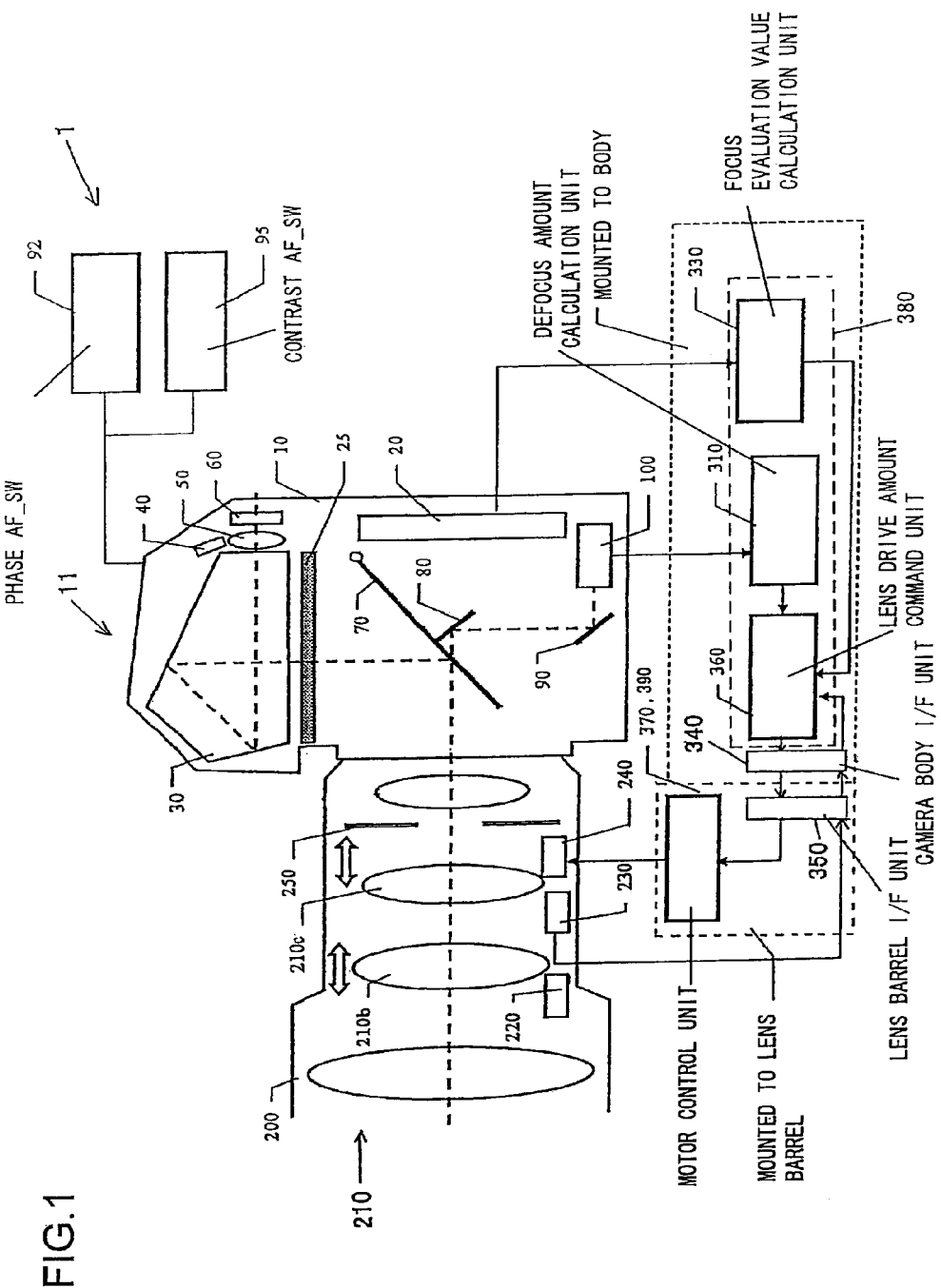
FIG. 1 is a figure showing a digital single lens reflex camera 1 that is an embodiment of the camera system of the present invention.

Before exposure, a quick return mirror 70 is in its position to cover over the image sensor 20, as shown in FIG. 1, and directs the light from the lens optical system 210 to the pentaprism 30 that is positioned above. During exposure, the mirror 70 is raised up to lie just below the focusing screen 25, so that the light from the lens optical system 210 is allowed to be conducted to the image sensor 20. Furthermore, a portion of the quick return mirror 70 in the vicinity of its center is made as a half mirrored section, so that a portion of the light is conducted to a phase type AF detection element 100 via a sub-mirror 80 and a fixed mirror 90.

The sub-mirror 80 is a mirror that reflects the light that has arrived via the lens optical system 210 and the quick return mirror 70 and the half mirror portion, so that this light is conducted to the fixed mirror 90 that is installed upon the body bottom surface side of the camera body. The fixed mirror 90 is a mirror for bending the direction of the light that has arrived from the sub-mirror 80 into the direction of the phase type AF detection element 100. The light that has arrived via the lens optical system 210 is thus conducted to the phase type AF detection element 100 via the sub-mirror 80 and the fixed mirror 90.

A phase AF switch 92 is a switch that is actuated by the photographer: phase detection autofocusing is executed only when the quick return mirror 70 is down and moreover this switch is ON. And a contrast AF switch 95 is also a switch that is actuated by the photographer: when the quick return mirror 70 is down and this switch is turned ON, the mirror is raised, and moreover contrast detection autofocusing is executed only when this switch is ON.

Furthermore, it would also be acceptable to provide a separate switch for issuing the mirror up command. For example, a photographic command switch might be provided for issuing a photography command. In this case, while the mirror was down, mirror up is performed by turning the photographic command switch ON, while, when the mirror is up, contrast AF is only executed when the contrast AF switch is ON.

The phase type AF detection element 100 first divides the light that has arrived from the lens optical system 210 into two sections with a mask (not shown in the figures), and then re-images this light upon two line sensors (also not shown in the figures). The amount of deviation between these two images that have been re-imaged upon these two line sensors corresponds to the amount of deviation of the focus (i.e. the defocusing amount). And the output of this phase type AF detection element 100 is sent to a defocus amount calculation unit 310.

A lens barrel 200 is a so called interchangeable lens that supports the predetermined lens optical system 210 and an aperture (diaphragm) 250 and so on in predetermined positions. The lens barrel is properly termed a lens barrel only because it supports the lens optical system 210 and the aperture 250 and so on accurately in their predetermined positions; but, in this embodiment, the use of the term "lens barrel" implies that the entire lens barrel, including a predetermined lens optical system 210 and the aperture 250 and control circuitry and so on, is a so called interchangeable lens.

The lens optical system 210 is an optical system for imaging an image of the photographic subject upon the image reception surface of the image sensor 20. A focal length adjustment lens 210b is a structure that is shiftable along the direction of the optical axis. Normally the position of the focal length adjustment lens 210b is changed by the user turning a zoom ring or the like not shown in the figures, and correspondingly thereto the focal length of the entire optical system 210 is caused to change. The position of the focal length adjustment lens 210b is monitored by a zoom encoder 220. In other words, this zoom encoder 220 monitors the focal length information.

A focus adjustment lens 210c is a structure that is shiftable along the direction of the optical axis, and is driven by a focus drive motor 240. The position of the focus adjustment lens 210c is monitored by a distance encoder 230. The signal generated by this distance encoder 230 monitoring the position of the focus adjustment lens 210c is transmitted to a lens drive amount command unit 360 via a lens barrel I/F unit 350 and a camera body I/F unit 340. It should be understood that the output of the distance encoder 230 is equivalent to the distance from the image reception surface of the image sensor 20 to the photographic subject that is being focused upon (i.e. to the photographic distance).

The focus drive motor 240 is an actuator for driving the focus adjustment lens 210c in the direction of the optical axis. A signal for driving the focus adjustment lens 210c is sent from a motor control unit 370.

The aperture 250 is an aperture iris that adjusts the amount of light arriving at the image sensor 20. The setting of this aperture 250 is sometimes performed automatically by the camera 1, and is sometimes performed by the photographer. If the program mode is the shutter speed priority mode, then the aperture value is determined from the output of the photometric element 40 or the like. In the case of the aperture priority mode or the manual mode, it is set by the photographer. This aperture 250 is controlled by an aperture control motor or the like not shown in the figures, according to a value that is set by the camera 1 or by the photographer.

A defocus amount calculation unit 310 calculates, from the output of the phase type AF detection element 100, a defocus amount that specifies the amount of focus deviation. This defocus amount is transmitted to the lens drive amount command unit 360.

A focus evaluation value calculation unit 330 calculates the focus evaluation value from the image output from the image sensor 20, that is on the image reception surface, and performs focus adjustment by detecting the position of the focus adjustment lens at which this becomes a maximum. In concrete terms, it calculates the focus evaluation value while slightly moving the focus adjustment lens 210c, and takes the position at which the focus evaluation value becomes a maximum as being the focus position. The method of calculating the focus evaluation value is generally the method of performing high frequency accentuation filter processing upon the image and integrating the result, but it is not particularly limited to this method. The focus evaluation value that has been calculated is transmitted to the lens drive amount command unit 360.

The lens drive amount command unit 360 sets the drive amount of the focus adjustment lens according to the results of defocus amount calculation and focus evaluation value calculation, and commands this drive amount to the motor control unit 370 via the camera body I/F unit 340 and the lens barrel I/F unit 350.

During auto focusing by the phase detection method, the lens drive amount command unit 360 issues the defocus amount as a drive command amount. Furthermore, approximately simultaneously with the drive command amount, a signal is transmitted for recognizing that phase detection autofocusing is performed (this AF method recognition signal being that some predetermined bit in the transmitted data is set to 1, i.e. is set to ON). It should be understood that it would also be acceptable to arrange for this AF method recognition signal to be that some predetermined bit in the transmitted data is set to zero.

It should be understood that the camera body I/F unit 340 and the lens barrel I/F unit 350 are interfaces for control signals to be exchanged between the camera body 10 and the lens barrel 200. As previously described, the lens barrel 200 is built so that it can be fitted and detached to and from the camera body 10. Accordingly, the lens drive amount command unit 360, the defocus amount calculation unit 310, the focus evaluation value calculation unit 330, and the camera body I/F unit 340 that are mounted to the camera body 10, and the motor control unit 370 and the lens barrel I/F unit 350 that are mounted to the lens barrel 200, are mechanically and electrically separate and independent.

Each of the lens drive amount command unit 360, the defocus amount calculation unit 310, and the focus evaluation value calculation unit 330 that are mounted to the camera body 10 provides its functions by being implemented as a portion of a predetermined program that is executed by a CPU 380 provided within the camera body 10. Moreover, functions related to control of the motor control unit 370 that is mounted to the lens barrel 200 are performed by a predetermined program being executed by a CPU 390 that is provided to the lens barrel 200. The motor control unit 370 also includes a drive circuit for driving the focus drive motor 240.

And, when the lens barrel 200 that is an interchangeable lens is mechanically mounted to the camera body 10, the lens barrel 200 and the camera body 10 are electrically connected together via the camera body I/F unit 340 and the lens barrel I/F unit 350. In other words, the motor control unit 370 and the lens drive amount command unit 360 are electrically connected together.

In this embodiment, a drive command amount for the focus adjustment lens and an AF method recognition signal are transmitted from the lens drive amount command unit 360 within the camera body 10 to the motor control unit 370 via the camera body I/F unit 340 and the lens barrel I/F unit 350. Accordingly, the camera body I/F unit 340 functions as a transmitter, and the lens barrel I/F unit 350 functions as a receiver.

Figure 4:
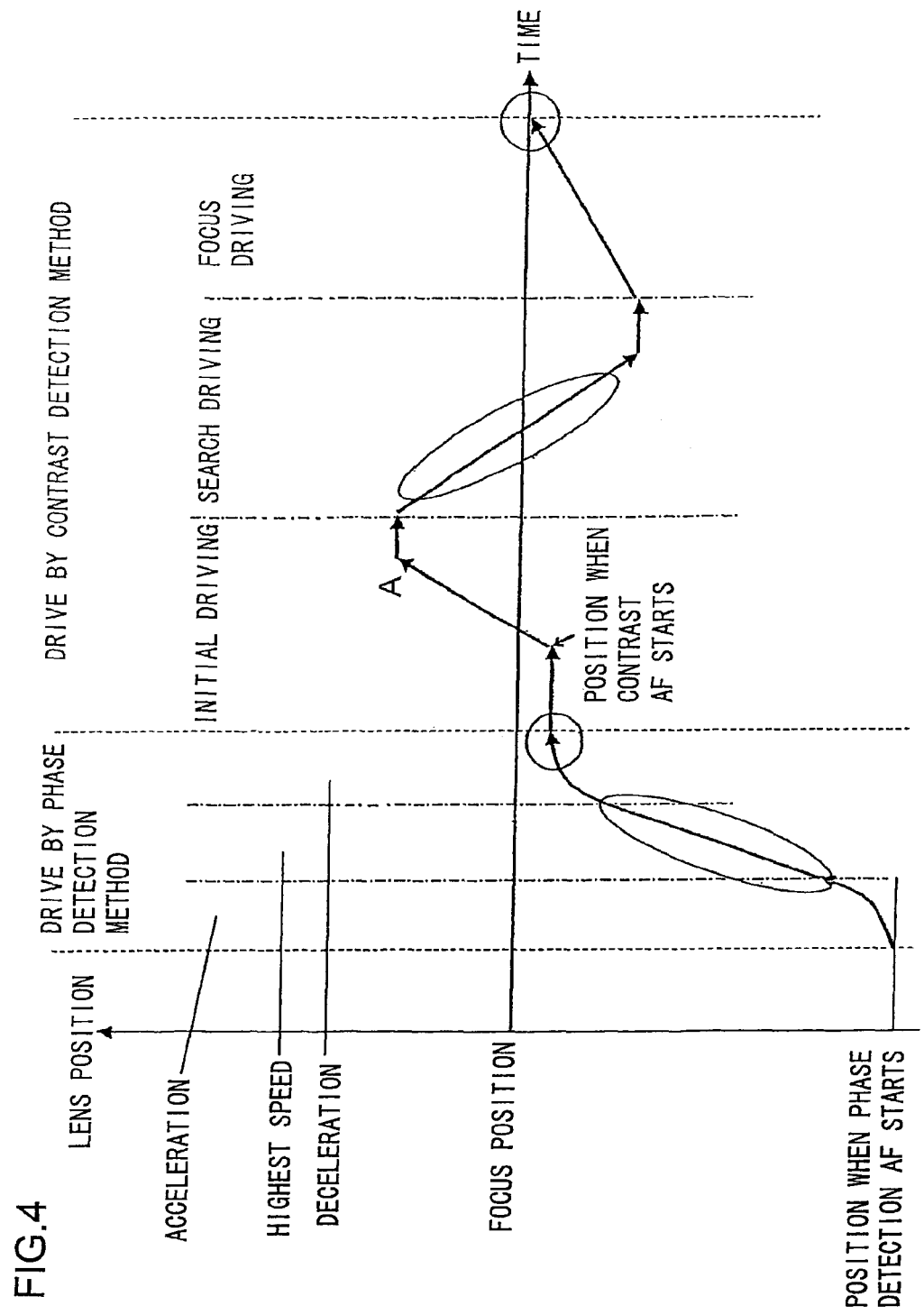
FIG. 4 is a figure for explanation of autofocusing by the phase detection method and autofocusing by the contrast detection method, in this embodiment.

Next, the process of autofocusing by the contrast detection method that is executed by the camera 1 of this embodiment will be explained with reference to FIG. 4. FIG. 4 is a figure for explanation of autofocusing by the phase detection method and autofocusing by the contrast detection method, in this embodiment. First the process of autofocusing by the contrast detection method in this embodiment will be explained using the right side half of FIG. 4. This autofocusing by the contrast detection method in this embodiment consists of three stages: initial driving, search driving, and focus driving.

In initial driving, the focus adjustment lens 210c is driven from its position when autofocusing by the contrast detection method starts to a position A that is displaced therefrom by a predetermined amount. Accordingly, the drive command amount is a predetermined value. Furthermore, a signal (the AF method recognition signal: setting the predetermined bit of the transmitted data) for recognizing that contrast AF is performed is transmitted approximately simultaneously with the drive command amount.

In search driving, the focus adjustment lens 210c is moved within a predetermined range and a focus evaluation value is acquired, so that the focus position is searched for. Accordingly, the drive command amount is a value that corresponds to this predetermined range. Even during search driving, the AF method recognition signal is still transmitted approximately simultaneously with the drive command amount. In autofocusing by the contrast detection method, the focus adjustment lens 210c is driven at a constant speed that is comparatively low, since it is desired to acquire the focus evaluation values at equal intervals that are quite close together.

In other words, in autofocusing by the contrast detection method, the drive speed of the focus adjustment lens 210c is controlled without permitting it to rise to the highest speed. This is because, if the drive speed of the focus adjustment lens 210c were to rise to the highest speed, then the intervals at which the focus evaluation values were acquired would become undesirably large, and the accuracy of detection of the focus position would be decreased. It should be understood that by the highest drive speed of the focus adjustment lens 210c is meant the highest speed at which the focus adjustment lens 210c can be driven, and it is the highest drive speed permitted for the focus adjustment lens 210c in the performance specification of the lens barrel 200.

It should be understood that it would also be acceptable to arrange to acquire the focus evaluation values while driving the focus adjustment lens 210c at a drive amount (a step width) that is finer than the predetermined range. In this case, a drive amount of the step width is set as the drive command amount after the focus evaluation value has been acquired. Here, as well, the AF method recognition signal is transmitted approximately simultaneously with the drive command amount.

And, in focus driving, when the focus position has been detected during search driving, the focus adjustment lens 210c is driven to this position. The drive command amount in this case is the difference between the position of the focus adjustment lens 210c when the focus position was detected and the detected focus position. Here, as well, the AF method recognition signal is transmitted approximately simultaneously with the drive command amount.

During this focus driving as well, the drive speed of the focus adjustment lens 210c is set to a constant speed that is slower than the highest speed. Due to this, it is possible to enhance the focusing accuracy while still keeping it possible to perform control so as to stop the lens 210c upon the target position exactly, without any fear of over-running.

Based upon the drive command amount and the AF method recognition signal that have been sent from the lens drive amount command unit 360 via the camera body I/F unit 340 and the lens barrel I/F unit 350, the motor control unit 370 controls the focus drive motor 240 so as to drive the focus adjustment lens 210c as specified by the amount of the drive command.

Next, the process of autofocusing by the phase detection method in this embodiment will be explained with reference to the left side half of FIG. 4. A command is issued from the lens drive amount command unit 360 so as to drive the focus adjustment lens 210c from the lens position at the start of autofocusing by the phase detection method to the focus position. Upon receipt of this command control is performed: to accelerate the drive speed of the focus adjustment lens 210c; when a highest speed that is determined upon in advance is attained, to maintain this speed; when a drive amount that is taken as being the target is being arrived at, to decelerate; and to stop a little before the focus position. In other words, the lens is driven slightly less than the drive command amount.

Making the focus adjustment lens 210c arrive at the highest possible speed, is performed in order to shorten the time period until focusing. Driving the lens at the highest possible speed is performed only when the AF method recognition signal specifies that autofocusing by the phase detection method is to be used. Performing control so as to stop the focus adjustment lens 210c a little before the focus position is done in order to prevent over-running. Since as described above the drive speed of the focus adjustment lens 210c is permitted to rise to the highest possible speed, accordingly, if control is not performed in order to stop a little before the focus position, over-running will occur, that is undesirable. This is because there is a fear that, if over-running occurs, the time period required for focusing may become long, or that hunting (a phenomenon in which the lens moves to and fro in the vicinity of the focus position) may occur, since it will become necessary to bring the lens back.

It should be understood that stopping the focus adjustment lens 210c a little before the focus position, means stopping it on the near side within the focus depth at the maximum aperture value of the lens optical system 210. For example, if the focus depth when the maximum aperture F value is 2.8 is ±20 µm, then the focus adjustment lens 210c may be driven by setting the lens stop target value between the target focus position and a position 20 microns shorter from the target focus position.

Furthermore, the stop control error of the focus adjustment lens 210c may also be considered. In this case, as the lens stop target value, a value is taken that, even if the stop control error of the focus adjustment lens 210c is added to it, does not exceed the target focus position and moreover is within the focus depth. However, if the stop control error width of the focus adjustment lens 210c is greater than the focal point depth width, then the lens stop target value is set by giving priority to the stop control error of the focus adjustment lens 210c. This is done in order reliably to prevent over-running.

Such performing control so as to prevent over-running is done only when the AF method recognition signal indicates that autofocusing by the phase detection method is being performed. It should be understood that, in autofocusing by the phase detection method, the drive speed of the focus adjustment lens 210c is controlled according to the drive command amount. If the drive command amount is larger than a predetermined value, then, as described above, control is performed so as to accelerate the drive speed, to maintain it at its highest level, and to decelerate it. On the other hand, if the drive command amount is smaller than the predetermined value, then the focus adjustment lens 210c is driven at a constant speed that is lower than its highest speed.

In autofocusing by the phase detection method, as described above, control is performed to stop the focus adjustment lens 210c a little before the focus position, so that over-running does not occur. However, even if the focus adjustment lens 210c is stopped a little before its focus position, no problem occurs, since the defocus amount is obtained for a second time, and the focus adjustment lens 210c is driven up to its focus position. Since the drive amount in this case is small, as described above, the driving of the focus adjustment lens 210c does not rise up to the highest speed level, so that it is driven to its focus position in an accurate manner at a low drive speed.

On the other hand, in autofocusing by the contrast detection method, as previously described, there is a fear that the accuracy will be deteriorated if the drive speed of the focus adjustment lens 210c is raised. Due to this, when the AF method recognition signal indicates autofocusing by the contrast detection method, it is arranged not to raise the drive speed of the focus adjustment lens 210c to its highest speed that is determined in advance. In other words the drive speed of the lens is set low, so that the interval at which the focus evaluation values are acquired becomes an interval (a comparatively narrow interval) at which the accuracy is not decreased. Moreover, in the case of focus driving as well, the lens is driven at a low drive speed.

Furthermore, when the AF method recognition signal indicates autofocusing by the contrast detection method, it is arranged not to perform control so that over-running does not occur. The focusing accuracy is decreased when control is performed so that over-running does not occur, since the lens is no longer stopped accurately at its focus position. Furthermore, it is not necessary to prevent over-running, since the drive speed of the lens is set to be slow, as described above.

Figure 5:
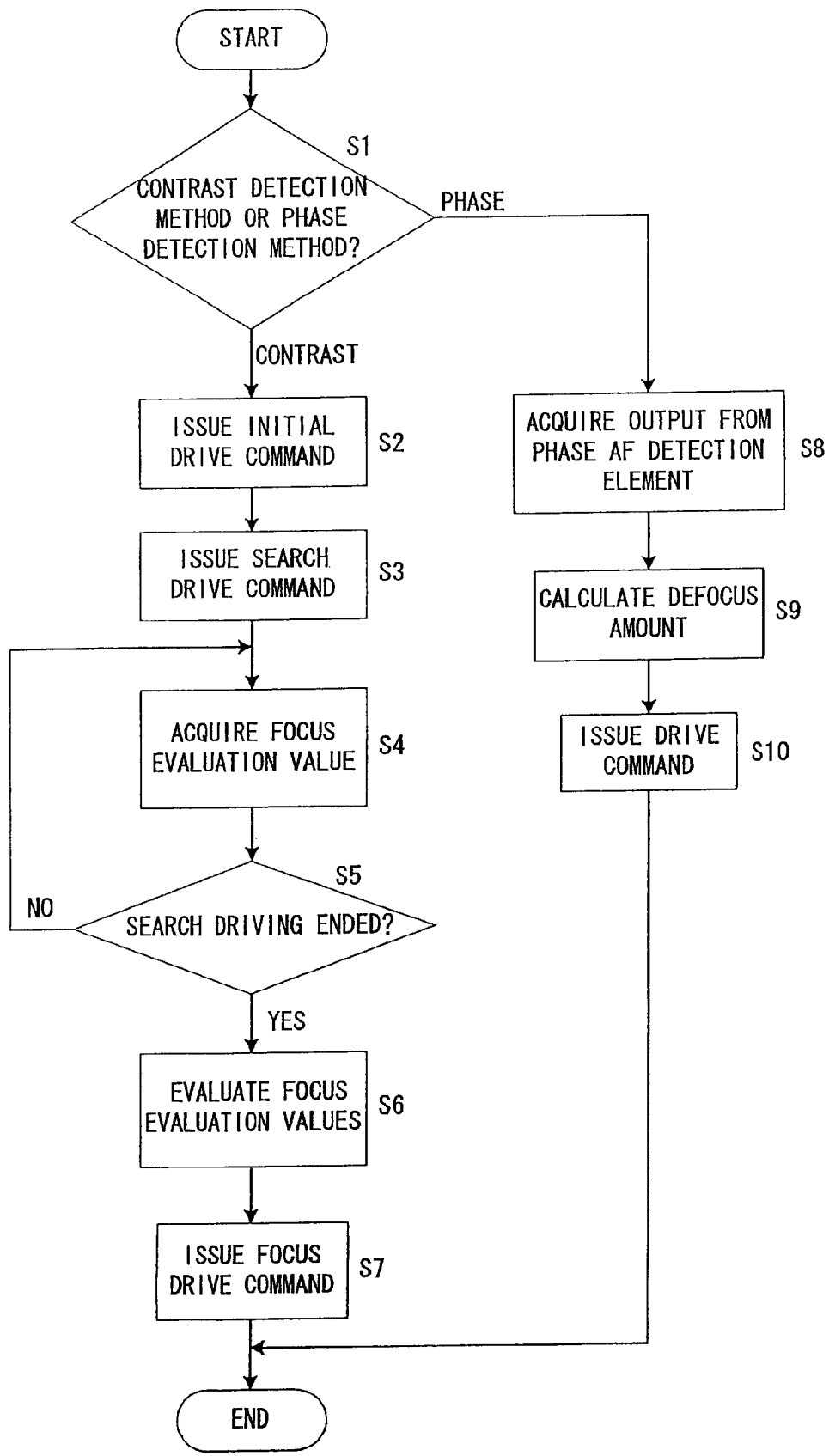
FIG. 5 is a figure showing a flowchart of a program that is executed by a CPU provided within the body of the camera.

FIG. 5 is a figure showing a flowchart of a program that is executed by the CPU 380 provided within the camera body (that corresponds to the lens drive amount command unit 360, the defocus amount calculation unit 310, and the focus evaluation value calculation unit 330). The flow chart of FIG. 5 represents processing that is started when processing for autofocusing of the camera 1 has become necessary. Either the use of autofocusing by the contrast detection method or the use of autofocusing by the phase detection method has been selected in advance by the user or by executing some algorism in the camera 1.

In a step S1, the CPU 380 decides whether autofocusing by the contrast detection method or autofocusing by the phase detection method is set. If autofocusing by the contrast detection method is set, then the flow of control proceeds to a step S2, whereas if autofocusing by the phase detection method is set, then the flow of control is transferred to a step S8.

In the step S2, the CPU 380 issues an initial driving command to the CPU 390 of the lens barrel 200. The drive amount from the current position of the focus adjustment lens 210c to a position A (see FIG. 4) and a signal (an AF method recognition signal) for recognizing that the contrast detection AF is performed are transmitted to the CPU 390. Then the flow of control proceeds to a step S3 at the timing when this initial driving has been completed. The timing of the completion of initial driving is decided by that the drive amount (moving amount) of the focus adjustment lens 210c is monitored with the output from the distance encoder 230 and it is judged whether or not the initial drive amount has been driven. It should be understood that it may be decided by that it is judged whether or not a predetermined time period has elapsed.

In the step S3, the CPU 380 issues a search drive command to the CPU 390. The drive command amount is a value that is equivalent to a predetermined range. Even during search driving, the AF method recognition signal is transmitted approximately simultaneously with the drive command amount. In the next step S4, the CPU 380 acquires a focus evaluation value. As previously described, this focus evaluation value is acquired by applying a predetermined filter to the image signal outputted from the image sensor 20 in a predetermined time interval ($\Delta t$) and integrating it.

Next in a step S5 the CPU 380 decides whether or not the search driving has ended. If it is decided that the search driving is not ended, then the flow of control returns to the step S4 and the above processing is repeated. However if it is decided that the search driving is ended, then the flow of control proceeds to a step S6. Whether or not the search driving has ended may be decided by that the drive amount (moving amount) of the focus adjustment lens 210c is monitored with the output from the distance encoder 230 and it is judged whether or not search driving has been performed for the predetermined range. It should be understood that it may be decided by that it is judged whether or not a predetermined time period has elapsed.

And in the step S6 the CPU 380 performs evaluation of the focus evaluation values. In other words, by a predetermined interpolation algorithm, it obtains the position of the focus adjustment lens at which the focus evaluation value becomes a maximum. Next in a step S7 the CPU 380 issues a focus drive command. This focus drive command specifies a drive amount from the current position of the focus adjustment lens 210c to the position that was obtained in the step S6. Even at this time, the AF method recognition signal is transmitted approximately simultaneously with the drive command amount. And when the processing in the step S7 ends, this processing for autofocusing is terminated.

On the other hand, if autofocusing by the phase detection method is selected, then in the step S8 the CPU 380 acquires the output from the phase type AF detection element 100. And next in a step S9 the CPU 380 calculates the defocus amount, based upon this output from the phase type AF detection element 100.

In a next step S10, the CPU 380 issues a drive command to the CPU 390 based upon the defocus amount that was obtained in the step S9. At this time, in a similar manner to the case of autofocusing by the contrast detection method, a signal for recognizing that autofocusing by the phase detection method is performed (an AF method recognition signal) is transmitted to the CPU 390. And, when the processing of this step S10 ends, the autofocus processing terminates.

As described above, when the CPU 380 within the camera body 10 sends a command to the CPU 390 that specifies a drive amount for the focus adjustment lens 210c, it always also transmits a signal (an AF method recognition signal) that specifies which of autofocusing by the contrast detection method and autofocusing by the phase detection method is performed.

FIG. 6 is a figure showing the flow chart of a program that is executed by the CPU 390 (the motor control unit 370) that is provided within the lens barrel 200. In a first step S21, the CPU 390 acquires a drive command from the CPU 380. This drive command from the CPU 380 includes the drive amount for the focus adjustment lens 210c and a signal (an AF method recognition signal) for specifying which of autofocusing by the contrast detection method and autofocusing by the phase detection method is performed.

In the next step S22, a decision is made as to which of autofocusing by the contrast detection method and autofocusing by the phase detection method is being specified by the AF method recognition signal. If autofocusing by the contrast detection method is specified then the flow of control proceeds to a step S23, while if autofocusing by the phase detection method is specified then the flow of control is transferred to a step S24.

In the step S23, the CPU 390 drives the focus adjustment lens 210c at a drive speed that is adapted to autofocusing by the contrast detection method and by the drive amount that has been commanded. This drive speed for the lens that is adapted to autofocusing by the contrast detection method, as previously described, is a drive speed for the lens that does not reach the highest speed of the focus adjustment lens 210c, and is a drive speed for the lens that is set low so that the interval at which the focus evaluation values are acquired becomes an interval at which the accuracy is not decreased (i.e. is a comparatively narrow interval). It should be understood that the highest speed of the focus adjustment lens 210c is several mm/S to several hundreds mm/S at the image plane, and the drive speed that does not reach the highest speed is 1 to 2 mm/S at the image plane, for example. When the driving of the lens in the step S23 ends, the processing of FIG. 6 terminates.

On the other hand, in the case of autofocusing by the phase detection method, in the step S24, the CPU 390 decides whether or not the drive amount that has been commanded is greater than a predetermined value. If it is larger than the predetermined value, then the flow of control proceeds to a step S25, while if it is not larger than the predetermined value, then the flow of control is transferred to a step S27.

In the step S25, the CPU 390 sets a value that is a little smaller (about 20 μm smaller, for example) than the drive amount that has been commanded as the drive amount for the focus adjustment lens 210c. And in the next step S26, as previously described, it performs control so as: to increase the drive speed of the focus adjustment lens 210c; when the speed arrives at a highest speed that is determined in advance, to maintain it at this highest speed; to decelerate the lens when it is almost arriving at a drive amount that is a little smaller target and was set in the step S25; and to stop the lens a little before the focus position. In other words, if the drive command amount is larger than the predetermined value, control is performed so as to increase the drive speed, to maintain it at its highest level, and then to reduce it.

On the other hand, in the step S27, the focus adjustment lens 210c is driven at a predetermined constant speed that is lower than its highest speed. In this case, a value that is a little smaller than the drive amount that has been commanded is not set as the drive amount for the focus adjustment lens 210c, since the possibility of the focus adjustment lens 210c over-running is low. And, when the driving of the lens in the step S26 or the step S27 ends, the processing of FIG. 6 terminates.

According to this embodiment as explained above, the following advantageous operational effects may be obtained.

(1) It is arranged for the lens drive amount command unit 360 to transmit to the motor control unit 370, along with the drive command amount, the AF method recognition signal (identification information) that specifies whether the autofocus method that is performed is autofocusing by the phase detection method or autofocusing by the contrast detection method. In other words, within the camera body 10, autofocus control is performed by the lens drive amount command unit 360, the defocus amount calculation unit 310, and the focus evaluation value calculation unit 330; and, along with this autofocus control, it is arranged to transmit the AF method recognition signal together with the drive command amount to the lens drive amount command unit 360 of the lens barrel 200.

Due to this, the motor control unit 370 is able to set the drive state (driving conditions) of the focus adjustment lens 210c in an appropriate manner for autofocusing, both during autofocusing by the phase detection method and during autofocusing by the contrast detection method. In other words, it is possible to control the driving of the imaging optical system in an appropriate manner, according to a plurality of focus detection methods. Moreover, even though the motor control unit 370 is provided within the lens barrel 200, that is an exchangeable lens that can be fitted to and removed from the camera body 10, still the information as to whether autofocusing by the phase detection method or autofocusing by the contrast detection method is performed is transmitted in an appropriate manner, and control according to either of these autofocusing methods is reliably performed within the lens barrel 200, that is an interchangeable lens. To put it in another manner, it is possible to change over the drive state (driving conditions) of the focus adjustment lens 210c for autofocusing according to whether autofocusing by the phase detection method or autofocusing by the contrast detection method is performed.

(2) During autofocusing by the phase detection method, it is arranged for the motor control unit 370 to permit the drive speed of the focus adjustment lens 210c to be raised up to the highest speed at which driving is possible. Due to this, it is possible to drive the focus adjustment lens 210c to its focus position at high speed. In this case, it is arranged to control the drive speed of the focus adjustment lens 210c so as: first, to increase this drive speed; when it has reached a highest speed that is determined in advance, to maintain this highest speed; then, when a target drive amount is being reached, to decelerate the lens; and then to stop the lens a little before its focus position. In other words, it is arranged to perform control while changing the drive speed of the focus adjustment lens 210c in an appropriate manner. By doing this, its driving is controlled at high speed.

(3) The reason for performing control so as to stop the focus adjustment lens 210c a little before its focus position, is to prevent it over-running. Since the drive speed of the focus adjustment lens is permitted to rise to its highest speed value, accordingly, if control is not performed so as to stop it a little before its focus position, then it may over-run, and this is undesirable. If the focus adjustment lens 210c does thus over-run, then it becomes necessary to perform control to return the focus adjustment lens 210c back again, and this entails a fear that the time period required for focusing may become long, or that hunting may occur, both of which are undesirable. However, by performing control so as to stop the lens a little before its focus position, it is possible to prevent these negative outcomes, and reliably to prevent the occurrence of over-running. It should be understood that the drive speed of the focus adjustment lens 210c may be referred to as a focusing speed of the focus adjustment lens 210c.

(4) On the other hand, in the case of autofocusing by the contrast detection method, control is performed so as not to permit the drive speed of the focus adjustment lens 210c to rise up to the highest possible speed at which the lens can be driven, and it is arranged to control the lens at a constant speed that is lower than the highest speed at which it can be driven. To put it in another manner, it is arranged to limit the drive speed of the focus adjustment lens 210c during autofocusing by the contrast detection method to a lower speed than the drive speed of the focus adjustment lens 210c during autofocusing by the phase detection method. Due to this, it is possible reliably to narrow down the interval at which the focus evaluation values are acquired, so that the accuracy at which the focus position is detected is enhanced.

(5) Since, in the case of autofocusing by the contrast detection method, the drive speed is relatively low, accordingly there is no fear of over-running. Accordingly, it is not necessary to perform control so as to stop the focus adjustment lens 210c a little before its focus position, as during autofocusing by the phase detection method. In other words, the processing when stopping the driving of the focus adjustment lens 210c is set so as to be different, during autofocusing by the contrast detection method and during autofocusing by the phase detection method. Due to this, it is possible to perform control so as to drive the focus adjustment lens in an appropriate manner, according to each of the autofocus methods.

(6) Since it is arranged to provide the camera body I/F unit 340 to the camera body 10 and to provide the lens barrel I/F unit 350 to the lens barrel 200, accordingly the camera body 10 and the lens barrel 200, both of which are both mechanically and electrically independent, are reliably electrically connected together simply by mounting (i.e. mechanically connecting) the lens barrel 200 to the camera body 10.

(7) When it is arranged for the lens drive amount command unit 360 to transmit the AF method recognition signal (i.e. the identification information) to the motor control unit 370, the following type of advantageous effects are also obtained. For example sometimes there may be a lens barrel that is not controlled exactly according to drive commands from the camera side due to some special conditions on the lens barrel side. In concrete terms, sometimes there may be a lens barrel that always performs control according to 80% of the drive command value from the camera side. This has not become a very large problem with single lens reflex cameras when autofocusing by the phase detection method has been the preferred method therein.

However, with a camera that employs both autofocusing by the phase detection method and also autofocusing by the contrast detection method, as per this embodiment, sometimes a problem occurs in autofocusing by the contrast detection method. The reason why is that, with autofocusing by the contrast detection method, accuracy in the sampling interval becomes necessary, and moreover accurate driving to the focus position also becomes necessary. Accordingly, although in autofocusing by the phase detection method a special type of control on the lens barrel side may be permitted due to special conditions, in autofocusing by the contrast detection method, exact control by commands from the camera side is demanded.

Thus this type of control becomes possible when, as in this embodiment, it is arranged to transmit an AF method recognition signal (i.e. identification information). In particular, with a lens barrel used in the prior art that performs a special type of control due to special conditions, the software may be only simply changed to recognize the AF method recognition signal (the identification information) and change over between performing the special type of control and performing normal control. Due to this, it becomes possible for a prior art type lens barrel that is intended to be used as a lens barrel (an exchangeable lens) of a camera that utilizes autofocusing by the phase detection method, also to be used as a lens barrel of a camera that employs both autofocusing methods, i.e. both autofocusing by the phase detection method and also autofocusing by the contrast detection method.

Variant Embodiments

It should be understood that it would also be possible to vary the embodiment described above in the following ways.

(1) Although the embodiment described above has been explained in terms of a digital single lens reflex camera as an example, a film type single lens reflex camera could also be considered. It would be possible to apply the present invention in a similar manner to a film type single lens reflex camera that performs autofocusing both by the contrast detection method and by the phase detection method.

(2) In the embodiment described above, an example of an interchangeable lens type single lens reflex camera was explained. This is because the present invention is particularly effective in the case of such an interchangeable lens type single lens reflex camera. This is because there are generally a lot of lens exchangeable type cameras in a typical product lineup, and it is not possible to ascertain on the body side what type of drive processing is being performed on the lens side. Thus it is better to output an identification signal from the body and to deal with it on the lens side. However, the camera need not necessarily be of the exchangeable lens type; it would also be possible to apply the present invention to a camera of the integrated lens type. In the case of such a camera of the integrated lens type, the present invention is particularly effective in a case such as when the camera body 10 and the lens barrel 200 are developed and designed independently, or when various different kinds of integrated lens type cameras are developed and designed by combining various different camera bodies 10 and lens barrels 200.

(3) In the embodiment described above, an example of a camera that employed both autofocusing by the phase detection method and autofocusing by the contrast detection method was explained. However, it would also be possible to apply the present invention to a camera that employs a combination of autofocusing methods other than that of autofocusing by the phase detection method and autofocusing by the contrast detection method. For example, the present invention could be applied to a camera that combines autofocusing by the contrast detection method and autofocusing by an external metering passive method. In other words, any system that recognizes the required autofocus method, and that changes over drive control of the lens according to the autofocus method that it has recognized, is included within the present invention. Moreover, a combination of three or more methods would also be acceptable. In other words, the present invention can be applied to any camera system that employs a plurality of autofocusing methods.

(4) The present invention can also be applied to a system that performs autofocusing by an active method. It should be understood that, in the case of a method in which the direction and the position of the focus position are ascertained even without moving the focus adjustment lens, as in the case of the phase detection method or an active method, it would also be acceptable for the lens not necessarily to be moved by a drive command from the body. This is equivalent to the control performed in the embodiment described above for preventing over-running. On the other hand, in the case of a method such as the contrast detection method in which the focus position cannot be ascertained without moving the focus adjustment lens, it is necessary to move the lens exactly by a command from the body. This is in order to prevent the focus position not being found or the accuracy being deteriorated, due to it not being possible to ensure the predetermined search range or step width if on the lens side the focus adjustment lens is not moved according to the command amount. Moreover, it is because it is not possible to ensure the focusing accuracy if, when driving the lens to its focus position, it does not move according to the command.

The above described embodiments are only examples; various modifications can be made without departing from the scope of the invention.

What is claimed is:

1. A camera system, comprising:
a focus detection controller that is capable of performing control for an imaging optics according to a plurality of focus detection systems; and
a drive controller that controls driving of the imaging optics, wherein
the focus detection controller transmits, to the drive controller, identification information that specifies which of the plurality of focus detection systems is used, together with drive amount information of the imaging optics;
when the identification information specifies a first one of the plurality of focus detection systems, the drive controller controls the driving speed of the imaging optics to be substantially constant; and
when the identification information specifies a second one of the plurality of focus detection systems, the drive controller performs control to vary the driving speed of the imaging optics.

2. A camera system according to claim 1, wherein
the drive controller changes driving control of the imaging optics according to the identification information.

3. A camera system according to claim 2, wherein
the drive controller sets driving conditions of the imaging optics according to the identification information.

4. A camera system according to claim 3, wherein
the drive controller sets driving speed of the imaging optics according to the identification information.

5. A camera system according to claim 4, wherein
when the identification information specifies a first one of the plurality of focus detection systems, the drive controller performs control so as to limit the driving speed to a lower speed than driving speed when the identification information specifies a second one of the plurality of focus detection systems.

6. A camera system according to claim 1, wherein
the drive controller performs processing when stopping driving of the imaging optics according to the identification information.

7. A camera system according to claim 6, wherein
when the identification information specifies a second one of the plurality of focus detection systems, the drive controller performs control so as to stop driving before a target stop position for the imaging optics.

8. A camera system according to claim 7, wherein
the drive controller performs control so as to stop driving before the target stop position for the imaging optics according to a focus depth of the imaging optics.

9. A camera system according to claim 7, wherein
the drive controller performs control so as to stop driving before the target stop position for the imaging optics according to a stop control error of the drive controller.

10. A camera system according to claim 1, further comprising:
a camera body; and
a lens barrel, wherein:
the focus detection controller is included in the camera body; and
the drive controller is included in the lens barrel.

11. A camera system comprising:
a focus detection controller that is capable of performing control for an imaging optics according to a plurality of focus detection systems; and
a focusing controller that controls focusing of the imaging optics, wherein:
the focus detection controller transmits, to the focusing controller, identification information that specifies which of the plurality of focus detection systems is used; and
when the identification information specifies a first one of the plurality of focus detection systems, the focusing controller controls the focusing speed of the imaging optics to be substantially constant; and
when the identification information specifies a second one of the plurality of focus detection systems, the focusing controller performs control to vary the focusing speed of the imaging optics.

12. A lens barrel, comprising:
an imaging optics;
a receiver that receives a focusing method recognition signal that specifies which of a plurality of focus detection systems is used, together with drive amount information of the imaging optics, from a camera body that is capable of performing control for the imaging optics according to the plurality of focus detection systems; and
a drive controller that performs control so as to set driving conditions of the imaging optics according to the focusing method recognition signal received by the receiver while using the drive amount information of the imaging optics received by the receiver, wherein
when the focusing method recognition signal specifies a first one of the plurality of focus detection systems, the drive controller controls the driving speed of the imaging optics to be substantially constant; and
when the focusing method recognition signal specifies a second one of the plurality of focus detection systems, the drive controller performs control to vary the driving speed of the imaging optics.

13. A lens barrel according to claim 12, wherein
the drive controller controls driving of the imaging optics at a highest speed in a performance specification of the imaging optics, when the received focusing method recognition signal specifies a phase detection autofocusing system.

14. A lens barrel according to claim 12, wherein
the drive controller performs control so as to stop driving before a focused position of the imaging optics, when the received focusing method recognition signal specifies a phase detection autofocusing system.

15. A lens barrel according to claim 12, wherein
the drive controller controls driving of the imaging optics at a constant speed, when the received focusing method recognition signal specifies a contrast detection autofocusing system.

16. A camera body in which a lens barrel including an imaging optics and a drive controller that controls driving of the imaging optics is exchangeable, comprising:
a focus detection controller that is capable of controlling the imaging optics according to a plurality of focus detection systems; and
a transmitter that transmits to the lens barrel identification information specifying which of the plurality of focus detection systems is used, together with drive amount information of the imaging optics, wherein
when the identification information specifies a first one of the plurality of focus detection systems, the drive controller of the lens barrel controls the driving speed of the imaging optics to be substantially constant; and
when the identification information specifies a second one of the plurality of focus detection systems, the drive controller of the lens barrel performs control to vary the driving speed of the imaging optics.

17. A camera system control method, comprising:
enabling an imaging optics to be controlled according to a plurality of focus detection systems;
transmitting identification information that specifies which of the plurality of focus detection systems is used, to a drive controller that controls driving of the imaging optics, together with drive amount information of the imaging optics;
controlling, by the drive controller, the driving speed of the imaging optics to be substantially constant when the identification information specifies a first one of the plurality of focus detection systems; and
performing, by the drive controller, control to vary the driving speed of the imaging optics when the identification information specifies a second one of the plurality of focus detection systems.

18. A camera system control method according to claim 17, wherein
the drive controller changes driving control of the imaging optics according to the identification information.

19. A camera system control method according to claim 18, wherein
the drive controller sets driving conditions of the imaging optics according to the identification information.

20. A camera system control method according to claim 19, wherein
the drive controller sets driving speed of the imaging optics according to the identification information.

21. A camera system control method according to claim 20, wherein
when the identification information specifies a first one of the plurality of focus detection systems, the drive controller performs control so as to limit the driving speed to a lower speed than driving speed when the identification information specifies a second one of the plurality of focus detection systems.

22. A camera system control method according to claim 17, wherein
the drive controller performs processing when stopping driving of the imaging optics according to the identification information.

23. A camera system control method according to claim 22, wherein
when the identification information specifies a second one of the plurality of focus detection systems, the drive controller performs control so as to stop driving before a target stop position for the imaging optics.

24. A camera system control method according to claim 23, wherein
the drive controller performs control so as to stop driving before the target stop position for the imaging optics according to a focus depth of the imaging optics.

25. A camera system control method according to claim 23, wherein
the drive controller performs control so as to stop driving before the target stop position for the imaging optics according to a stop control error of the drive controller.

26. A camera system control method according to claim 17, wherein:
the plurality of focus detection systems for the imaging optics are controlled from a side of a camera body; and
the driving of the imaging optics is controlled from a side of a lens barrel.

27. A camera system control method, comprising:
enabling an imaging optics to be controlled according to a plurality of focus detection systems;
transmitting identification information that specifies which of the plurality of focus detection systems is used, to a focusing controller that controls focusing of the imaging optics, wherein
when the identification information specifies a first one of the plurality of focus detection systems, the focusing controller controls the focusing speed to be substantially constant; and
when the identification information specifies a second one of the plurality of focus detection systems, the focusing controller performs control to vary the focusing speed.

* * * * *